Patented Aug. 24, 1948

2,447,544

UNITED STATES PATENT OFFICE 2,447,544

SYNTHESIS OF TRYPTOPHANE

Harold R. Snyder, Urbana, Ill., and Eugene E. Howe, Linden, and Arthur J. Zambito, Rahway, N. J., assignors to Merck & Co., Inc., Rahway, N. J., a corporation of New Jersey No Drawing. Application October 21, 1944, Serial No. 559,836

16 Claims. (Cl. 260—319)

This invention relates generally to processes for producing dl-trytophane, and particularly to a new process for preparing intermediates useful in preparing dl-tryptophane.

dl-Tryptophane has been heretofore prepared by condensing indole-3-aldehyde with hydantoin or hippuric acid. According to a new synthesis for dl-tryptophane fully disclosed in a companion joint application by one of the present applicants filed concurrently with this application (Serial No. 559,837 filed October 21, 1944) an alkali metal derivative of an acylamidomalonic ester is condensed with a quaternary substituted 3-aminomethyl-indole such as, for example, gramine methiodide, to form as an intermediate the corresponding ester of the α-acylamido-α-carboxy-β-(3-indole)-propionic acid. This intermediate is converted to dl-tryptophane by deesterification, decarboxylation, and deacetylation.

It is now discovered according to the present invention that this intermediate and related compounds can be prepared without resorting to the quaternary ammonium salt and alkali metal derivative as above mentioned by reacting a tertiary substituted 3-aminomethyl-indole such as, for example, gramine and an acylamidomalonic ester such as ethyl acetamidomalonate.

Considered in certain of its broader aspects, the novel process according to this invention comprises condensing a tertiary substituted 3-aminomethyl-indole with monoacyl and diacyl-aminomalonic esters and recovering the corresponding ester of α-acylamido-α-carboxy-β-(3-indole)-propionic acid. The reaction is illustrated as follows:

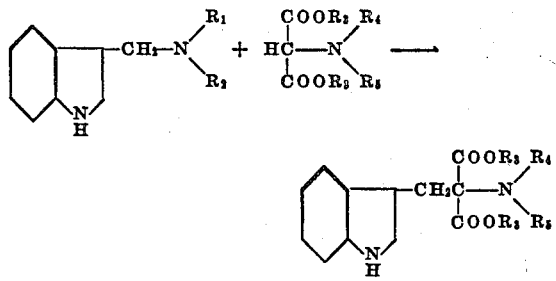

where $R_1$ and $R_2$ each represent an alkyl, aryl or aralkyl radical, or $R_1$ and $R_2$ together form part of a N-heterocyclic radical, $R_3$ represents an alkyl, aryl, or aralkyl radical, $R_4$ represents an acyl radical, $R_5$ represents hydrogen or an acyl radical, or $R_4$ and $R_5$ may be a dicarboxylic organic acid radical.

The condensation is effected by heat alone, fusion of the reactants, or by heating in a suitable organic solvent such as, for example, toluene, xylene, pyridine and dioxane, the latter method being more satisfactory especially from the standpoint of control of the reaction. Even better yields and a purer product are obtained by carrying out the condensation in solvents in the presence of a basic catalyst. Suitable catalysts for this purpose are alkali and alkaline earth metals, their hydroxides, carbonates, and alcoholates. It is also found that the amount of air or oxygen to which the reaction is exposed affects the yield and purity of the product. Best results are obtained by carrying out the condensation in an oxygen-free atmosphere by circulating through the reaction chamber an inert gas such as, for example, nitrogen.

The following examples illustrate methods of carrying out the present invention but it is to be understood that these examples are given by way of illustration and not of limitation.

Example I

To a mixture of about 17 g. of powdered sodium hydroxide and 1275 cc. of toluene heated to reflux with agitation is added a mixture of about 250 g. of gramine and about 311 g. of ethyl acetamidomalonate in an oxygen-free atmosphere. The mixture is then refluxed for about 5 hours with agitation and maintaining a flow of an inert gas through the mixture. The hot reaction mixture is then filtered and cooled, causing the separation of ethyl-α-acetamido-α-carbethoxy-β-(3-indole) propionate (M. P. 158–159° C.) which is removed by filtration and purified by conventional operations.

Example II

A mixture of 19.7 g. of gramine, 24.5 g. of ethyl acetamidomalonate and 100 cc. of pyridine is refluxed for about 2 hours in an oxygen-free atmosphere. The resulting mixture is treated with activated carbon, filtered, concentrated to a volume of about 50 cc., and diluted with about 20 cc. of water. This mixture is then held at about 5° C. for about 6 hours, after which an additional 80 cc. of water is added and the mixture maintained at approximately 5° C. for an additional 18 hours. The precipitated ethyl-α-acetamido-α-carbethoxy-β-(3-indole) propionate (M. P. 157–158° C.) so obtained is removed by filtration.

Example III

To about 24.5 g. of ethyl acetamidomalonate at 150° C. is added about 19.7 g. of gramine over a period of about 5 to 10 minutes. The temperature is raised during this addition to about 165° C. and is maintained at this temperature for about 10 minutes after all of the gramine is added. The resulting red oily product is cooled to about 70° C., dissolved in 70 cc. of ethanol, and then diluted with about 50 cc. of warm water. This solution is cooled at about 5° C. for approximately 18 hours, causing precipitation of the ethyl-α-acetamido-α-carbethoxy-β-(3-indole) propionate (M. P. 157–158° C.) which is removed by filtration.

*Example IV*

To a boiling mixture of 150 cc. of toluene and 2 g. of powdered sodium hydroxide in an oxygen-free atmosphere is added, with agitation, about 36.8 g. of ethyl acetamidomalonate and about 34.4 g. of β-(diethylaminomethyl)-indole. The reaction mixture is then refluxed with agitation for about 2 hours while maintaining the inert atmosphere. The reflux reaction mixture is then filtered, and the filtrate cooled to about 5° C. for several hours causing the separation of ethyl-α-acetamido-α-carbethoxy-β-(3-indole) propionate (M. P. 156–158° C.) which is removed by filtration.

*Example V*

About 2.45 g. of ethyl acetamidomalonate and about 2.42 g. of β-(N-piperidyl-methyl)-indole are condensed in a reaction media consisting of 10 cc. of toluene and $\frac{1}{10}$ g. of powdered sodium hydroxide, refluxed, and the product, ethyl α-acetamido-α-carbethoxy-β-(3-indole) propionate (M. P. 157–158° C.), is obtained using the procedure employed in the preceding Example IV.

*Example VI*

To 15 cc. of toluene and .3 g. of powdered sodium hydroxide is added about 3.5 g. of ethyl phthalimidomalonate and about 2.0 g. of gramine, and the mixture refluxed for about 5 hours. The refluxed reaction mixture is then filtered, while hot, and cooled, causing the separation of ethyl-α-phthalimido-α-carbethoxy-β-(3-indole) propionate (M. P. 175–176° C.) which is recovered by filtration and purified by conventional operations.

While in the foregoing examples the use of sodium hydroxide as a catalyst in the condensation is described, it is understood that the condensation proceeds in the same manner when other basic catalysts previously enumerated are substituted for sodium hydroxide. Likewise, the condensation proceeds in the manner indicated when other solvents, previously identified, are substituted for the solvents employed in the examples.

It should also be noted that while N-alkyl substituted 3-aminomethyl-indole compounds, and compounds wherein the N-substituents form a N-heterocyclic radical (piperidyl radical), are referred to in the examples, aryl substituted compounds such as 3-diphenylaminomethyl-indole and aralkyl compounds such as 3-dibenzylaminomethyl-indole can be employed. The by-product amine compounds formed in the condensation, when low boiling as in the case of dimethylamine or diethylamine, are removed from the reaction mixture in the gaseous state during condensation. When these by-product amines are high boiling as in the case of piperidine diphenylamine or dibenzylamine, they remain in the solvent and are thus separated from the precipitated condensation product.

The process is described in the examples using ethyl acetamidomalonate and ethyl phthalimidomalonate in the condensation. It is understood, however, that compounds having other alkyl as well as aryl and aralkyl ester groups and other N-acyl substituents can be employed. Thus, other starting materials are compounds such as methyl acetamidomalonate, ethyl acetamidomalonate, phenyl acetamidomalonate, benzyl acetamidomalonate, and the like, and corresponding esters of other acylamidomalonic acids such as formamidomalonic acid, benzamidomalonic acid, phthalimidomalonic acid and the like. The products obtained by condensing these compounds with a tertiary substituted 3-aminomethyl-indole are methyl, ethyl, phenyl or benzyl esters of α-formamido-α-carboxy-β-(3-indole)-propionic acid, α-acetamido-α-carboxy-β-(3-indole)-propionic acid, α-benzamido-α-carboxy-β-(3-indole)-propionic acid, and α-phthalimido-α-carboxy-β-(3-indole)-propionic acid. These compounds are converted to dl-tryptophane as previously described by deesterification, decarboxylation, and deacetylation.

By the term acylamido as employed in the following claims is meant: an amido group of the class consisting of mono-acylamido and di-acylamido groups, including groups wherein the acyl substituents are linked by an alkyl or an aryl grouping. It is also to be understood that the esters referred to in the specification and claims are the di-esters.

Modifications may be made in carrying out the present invention without departing from the spirit and scope thereof, and the invention is to be limited only by the appended claims.

What is claimed is:

1. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, thereby forming the corresponding ester of α-acylamido-α-carboxy-β-(3-indole)-propionic acid.

2. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in an oxygen-free atmosphere, thereby forming the corresponding ester of α-acylamido-α-carboxy-β-(3-indole)-propionic acid.

3. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, by heating a mixture thereof, thereby forming the corresponding ester of α-acylamido-α-carboxy-β-(3-indole)-propionic acid.

4. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials, thereby forming the corresponding ester of α-acylamido-α-carboxy-β-(3-indole)-propionic acid.

5. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials while maintaining an oxygen-free atmosphere, thereby forming the corresponding ester of α-acylamido-α-carboxy-β-(3-indole)-propionic acid.

6. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials and a basic catalyst of the class consisting of alkali and alkaline earth metals, their hydroxides, carbonates, and alcoholates, thereby forming the corresponding ester of α-acylamido-α-carboxy-β-(3-indole)-propionic acid.

7. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials and a basic catalyst of the class consisting of alkali and alkaline earth metals, their hydroxides, carbonates, and alcoholates while maintaining an oxygen free atmosphere, thereby forming the corresponding ester of α-acylamido-α-carboxy-β-(3-indole)-propionic acid.

8. The process that comprises condensing gramine with ethyl acetamidomalonate thereby forming ethyl α-acetamido-α-carbethoxy-β-(3-indole)-propionate.

9. The process that comprises condensing gramine with ethyl acetamidomalonate in the presence of toluene and a small amount of sodium hydroxide as a catalyst while maintaining an oxygen-free atmosphere thereby forming ethyl α-acetamido-α-carbethoxy-β-(3-indole)-propionate.

10. The process that comprises condensing 3-diethylaminomethyl indole with ethyl acetamidomalonate thereby forming ethyl α-acetamido-α-carbethoxy-β-(3-indole)-propionate.

11. The process that comprises condensing 3-diethylaminomethyl indole with ethyl acetamidomalonate in the presence of toluene and a small amount of sodium hydroxide as a catalyst while maintaining an oxygen-free atmosphere thereby forming ethyl α-acetamido-α-carbethoxy-β-(3-indole)-propionate.

12. The process that comprises condensing 3-piperidylaminomethyl indole with ethyl acetamidomalonate thereby forming ethyl α-acetamido-α-carbethoxy-β-(3-indole)-propionate.

13. The process that comprises condensing 3-piperidylaminomethyl indole with ethyl acetamidomalonate in the presence of toluene and a small amount of sodium hydroxide as a catalyst while maintaining an oxygen-free atmosphere thereby forming ethyl α-acetamido-α-carbethoxy-β-(3-indole)-propionate.

14. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in a nitrogen atmosphere, thereby forming the corresponding ester of α-acylamido-α-carboxy-β-(3-indole)-propionic acid.

15. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials while maintaining a nitrogen atmosphere, thereby forming the corresponding ester of α-acylamido-α-carboxy-β-(3-indole)-propionic acid.

16. The process that comprises condensing a 3-aminomethyl indole compound with an unsubstituted ring nitrogen and having tertiary N-substituents selected from the class consisting of alkyl, aryl, and aralkyl groups and groups wherein the substituents form part of a N-heterocyclic radical with an acylamidomalonic ester having an active hydrogen on the central carbon atom, in the presence of a non-reactive organic liquid which is a solvent for the starting materials and a basic catalyst of the class consisting of alkali and alkaline earth metals, their hydroxides, carbonates, and alcoholates in a nitrogen atmosphere, thereby forming the corresponding ester of α-acylamido-α-carboxy-β-(3-indole)-propionic acid.

HAROLD R. SNYDER.
EUGENE E. HOWE.
ARTHUR J. ZAMBITO.

REFERENCES CITED

The following references are of record in the file of this patent:

Albertson et al.: J. Am. Ch. Soc., vol. 66 (1944), p. 500.